United States Patent
Natroshvili

(10) Patent No.: US 9,582,881 B2
(45) Date of Patent: Feb. 28, 2017

(54) MACHINE VISION IMAGE SENSOR CALIBRATION

(71) Applicant: Intel Corporation, Santa Clara, CA (US)

(72) Inventor: Koba Natroshvili, Waldbronn (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/662,026

(22) Filed: Mar. 18, 2015

(65) Prior Publication Data

US 2016/0275682 A1 Sep. 22, 2016

(51) Int. Cl.
*G06T 7/00* (2006.01)
*G06F 17/14* (2006.01)
*G06T 3/00* (2006.01)
*H04N 17/00* (2006.01)

(52) U.S. Cl.
CPC .......... *G06T 7/0018* (2013.01); *G06F 17/142* (2013.01); *G06T 3/0018* (2013.01); *H04N 17/002* (2013.01); *G06T 2207/20056* (2013.01)

(58) Field of Classification Search
CPC ............. G06T 7/0018; G06T 3/0018; G06T 2207/20056; G06F 17/142; H04N 17/002
See application file for complete search history.

(56) References Cited

U.S. PATENT DOCUMENTS

| | | | | |
|---|---|---|---|---|
| 2010/0329582 A1* | 12/2010 | Albu | ...................... | G06T 5/003 382/255 |
| 2011/0216201 A1* | 9/2011 | McAndrew | ........... | G06T 7/0018 348/148 |
| 2012/0242839 A1* | 9/2012 | Shen | ..................... | H04N 17/002 348/187 |
| 2012/0320190 A1* | 12/2012 | Natroshvili | ............. | G06T 5/006 348/135 |
| 2014/0184799 A1* | 7/2014 | Kussel | ................. | G01B 11/272 348/148 |

OTHER PUBLICATIONS

Beyerer et al, "Die Radontransformation in der digitalen Bildverarbeitung", Fraunhofer Institute for Optronics, System Technology and Image Exploitation, Oct. 2002, pp. 472-480 (9 pages).
R. Bamler, Mehrdimensionale Lineare Systeme, Fourier Transformation und Functiones, Springer Verlag, 1989.

* cited by examiner

*Primary Examiner* — Brian Yenke
*Assistant Examiner* — Sean Haiem
(74) *Attorney, Agent, or Firm* — Green, Howard & Mughal, LLP

(57) ABSTRACT

A system, apparatus, method, and computer readable media for calibration of one or more extrinsic image sensor parameters. A system may calibrate a multi-camera surround view system, for example as may be employed in a vehicle, based on image data comprising one or more ground plane landmarks. The system may determine a ground plane projection of the image data, for example through a Radon transformation. A signal associated with at least one of the one or more ground plane landmarks in the ground plane projection(s) may be determined, for example through application of the projection-slice theorem. The landmark signal may be utilized as a response in an automated calibration loop to optimize one or more extrinsic parameter values associated with the sensors.

15 Claims, 11 Drawing Sheets

MACHINE VISION IMAGE SENSOR CALIBRATION

BACKGROUND

Machine vision continues to make rapid advances. Many current machine vision systems utilize a surround view system where image data captured by different image sensors (e.g., different cameras) are combined with each other. To properly couple multiple image sensors, calibration may be performed to establish extrinsic and intrinsic parameters associated with each sensor. Extrinsic parameters include orientations and positions of a sensor relative to the other sensors. Intrinsic parameters include those used in correcting image distortion resulting from the sensor optical path, such as but not limited to, non-linear distortions associated with wide-angle light collection (e.g., commonly known as fisheye distortions). Together, these sensor parameters facilitate mapping an image data frame position to a world position relevant to the platform hosting the machine vision system.

Image sensor calibration is important in the initial installation of a machine vision system into a platform (e.g., during vehicle manufacture). Subsequent calibration (i.e., re-calibration) is also important to maintain machine vision performance throughout the life of the platform. For example, extrinsic sensor parameters are susceptible to drift as a result of platform vibrations, and are also susceptible to large step function changes as a result of platform impacts and/or sensor replacement. Therefore, robust machine vision sensor calibration systems and techniques that do not require extensive manual measurement and/or very controlled calibration environments are advantageous.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1A:
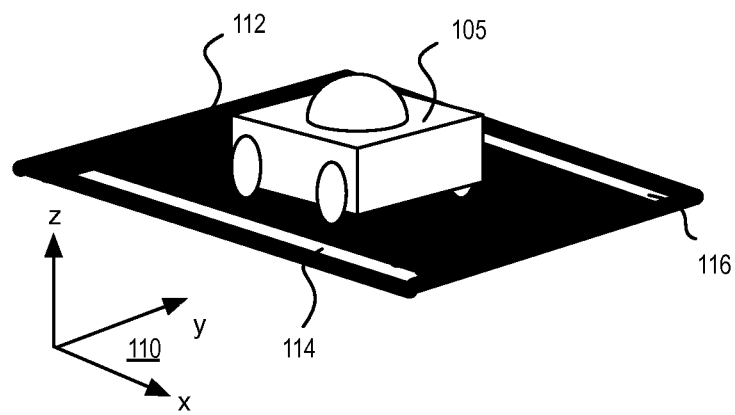
FIG. 1A is an isometric view of an exemplary vehicle platform employing a machine vision image sensor calibration system, in accordance with some embodiments.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and in the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures, such system-on-a-chip (SoC) architectures for example, implementation of the techniques and/or arrangements described herein are not restricted to particular architectures and/or computing systems, and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein may be implemented in hardware, for example as logic circuitry in an image processor. Certain other portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

Exemplary systems, methods, and computer readable media are described below for calibration of one or more extrinsic image sensor parameters. In some embodiments, a machine vision calibration system determines a ground plane projection of the image data, for example through a Radon transformation. In some embodiments, the calibration system further determines a signal associated with at least one of the one or more ground plane landmarks in the ground plane projection(s), for example through application of the projection-slice theorem. In some embodiments, the calibration system evaluates a parameterization of the landmark signal, such as the peak height. In some embodiments, the signal peak is evaluated as extrinsic parameter values are varied in an automated calibration loop to optimize one or more extrinsic parameter values associated with the sensors.

FIG. 1A is an isometric view of an exemplary platform 105 hosting a machine vision image sensor calibration system, in accordance with some embodiments. Although details of embodiments are described herein in the context of vehicle host platform for clarity of description, the machine vision calibration systems and methods described herein are nonetheless applicable to any machine vision host platform whether stationary, mobile, autonomous, or non-autonomous. As used herein, terms such as "front," "rear," "driver side," and "passenger side" may be understood in the context of a coordinate system based on the exemplary vehicle platform. In reference to FIG. 1A for example, in host platform 105 the front and rear sides intersect the x-axis while the driver and passenger sides intersect the y-axis. Host platform 105 is disposed over a ground plane 110 that extends in the two-dimensional x-y world coordinate space intersecting the z-axis. In some embodiments, the ground plane is flat (z=0), but includes one or more feature or landmark visible to machine vision image sensors. In the illustrative embodiment, ground plane 110 comprises a two-dimensional (2D) background 112 and 2D ground plane calibration landmarks 114, 116. In this exemplary embodiment, ground plane calibration landmarks 114, 116 have sufficient contrast with background 112 to be visible to a machine vision system embedded in vehicle platform 105.

In some embodiments, ground plane calibration landmarks comprise one or more parking lines of the sort found in most any parking lot. Because parking lines are highly-standardized world over, the calibration techniques and systems described herein that utilize such landmarks may be robustly employed in many machine vision use cases applicable to a vehicle platform. In the embodiment illustrated in FIG. 1A, calibration landmarks 114, 116 comprise a pair of straight lines. In some embodiments, the calibration landmarks 114, 116 comprise a pair of straight lines, each line positioned adjacent to opposing first (driver) and second (passenger) sides of platform 105. In further embodiments, the calibration landmarks 114, 116 comprise a pair of straight lines, parallel to each other and of a same length, and positioned adjacent to opposing (driver and passenger) sides of platform 105. Ground plane calibration landmarks 114, 116 as well as background 112 may be of any color, however the exemplary embodiment in FIG. 1A illustrates a common implementation entailing lighter (e.g., white) lines painted on a darker (e.g., asphalt or concrete) road surface.

Figure 1B:
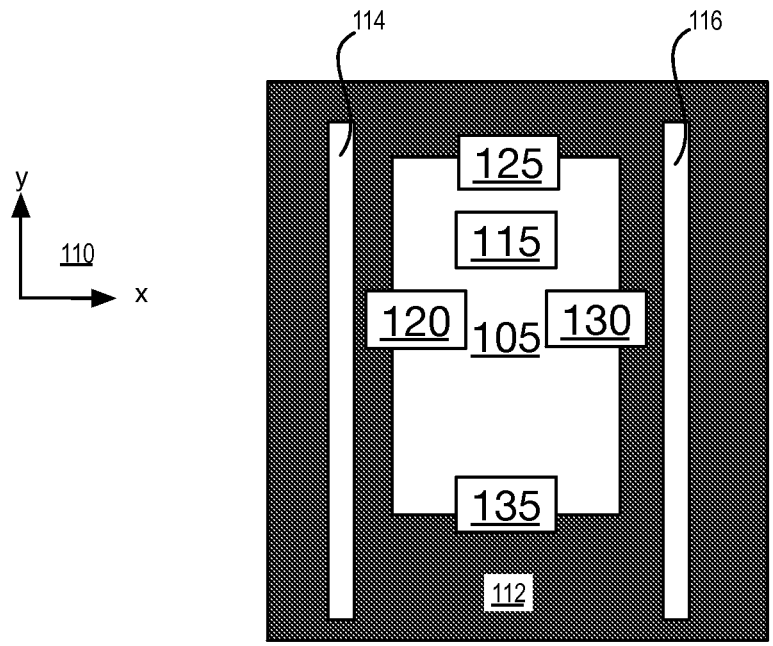
FIG. 1B is a plan view of the exemplary vehicle platform employing a machine vision image sensor calibration system, in accordance with some embodiments.

In some embodiments, a machine vision system includes a plurality of image sensors. Two or more image sensors may be employed in the machine vision system. In some embodiments, the number of image sensors employed is sufficient to generate a surround view encompassing 360° arc about the platform within a plane parallel to ground plane 110. FIG. 1B is a plan view of the exemplary vehicle platform 105 employing a machine vision calibration system, in accordance with some embodiments. In this illustrative embodiment, vehicle platform 105 includes four image sensors: driver side sensor 120; front sensor 125; passenger sensor 130; and rear sensor 135. In some embodiments, each sensor 125-135 comprises a video camera sampling light collected over a predetermined and/or known field of view (FOV). Image data output from each of image sensors 120-135 is coupled into a machine vision module 115. Image sensors 120-135 may be wide-angle image sensors, enabling the four sensors to capture a FOV sufficient for a machine vision module to construct a surround view.

Figure 2:
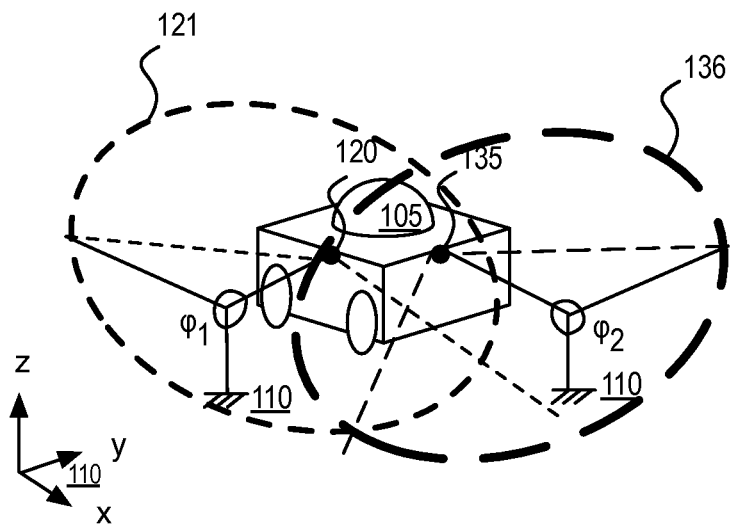
FIG. 2 is an isometric view of an exemplary vehicle platform depicting fields of view for two image sensors, in accordance with some embodiments.

In some embodiments, the image sensor FOV is to include the ground plane. FIG. 2 is an isometric view of an exemplary host platform 105 depicting fields of view for two image sensors 120 and 135, in accordance with some embodiments. Image sensor 120 is associated with a FOV 121 extending away from platform 105 in the y-dimension. Image sensor 135 is associated with a FOV 136 extending away from platform 105 in the x-dimension. In the context of the exemplary host platform 105 illustrated in FIG. 2, extrinsic image sensor parameters include information characterizing at least relative positions and orientations of image sensors 120 and 135. In the exemplary embodiment, three image sensor orientations $\phi_1$ (e.g., yaw, pitch, and roll) may be determined in reference to ground plane 110 for image sensor 120, and three image sensor orientations $\phi_2$ may likewise be determined for image sensor 135.

Figure 3A:
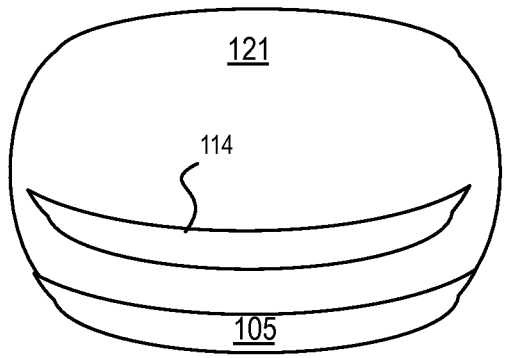
FIGS. 3A and 3B illustrate example images captured by the two image sensors depicted in FIG. 2, in accordance with some embodiments.
Figure 3B:
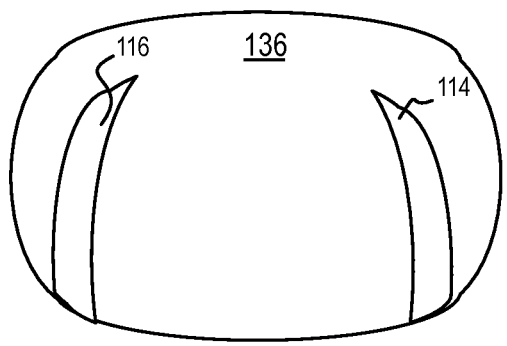

In some embodiments, each image sensor 120, 135 collects light samples through an optical path that includes a fisheye lens accommodating the wide FOV. Wide-angle light collection in some embodiments results in non-linear distortions in the image data collected by each sensor. Examples of non-linear distortion include, but are not limited to radial distortion, barrel distortion, and/or fisheye distortion. FIG. 3A illustrates an example image frame collected by and/or generated from image sensor 120. FIG. 3B illustrates an example image frame collected by and/or generated from image sensor 135, in accordance with some embodiments. Fisheye distortion is apparent in the ground plane calibration landmarks 114, 116 visible within each image sensor FOV 121, 136. Each FOV 121, 136 may have an angular opening along a plane parallel to ground plane 110 of at least 170°, and advantageously at least 175°. The wide FOV includes the ground plane in a region immediately adjacent to host platform 105 and may include portions of platform 105. FOV overlap between multiple sensors may vary as a function of extrinsic parameter values associated with the image sensors. In the exemplary embodiment where image sensor 120 is positioned on a diver side surface (e.g., on a side door mirror) and image sensor 135 is positioned on a rear surface (e.g., on a rear bumper) that is approximately orthogonal to the position of sensor 120, FOV 121 and 136 may have an angular overlap along a plane parallel to ground plane 110 as high as 50-70° as a function of each sensor's orientation.

Figure 4:
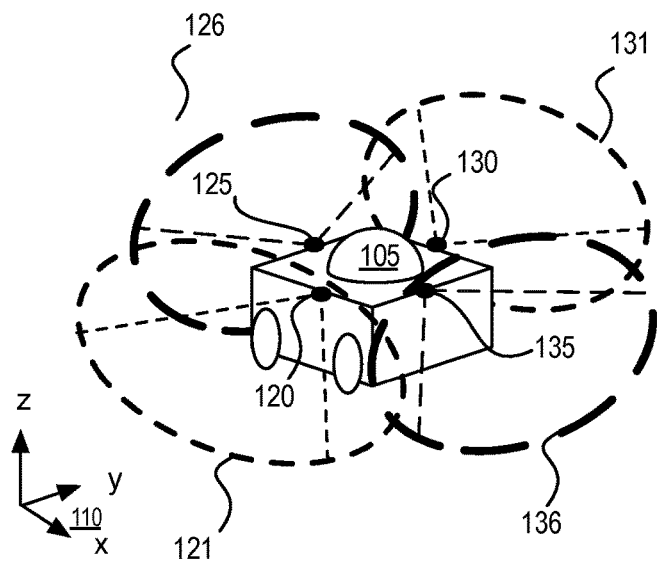
FIG. 4 is an isometric view of an exemplary vehicle platform depicting fields of view for four image sensors, in accordance with some embodiments.
Figure 5A:
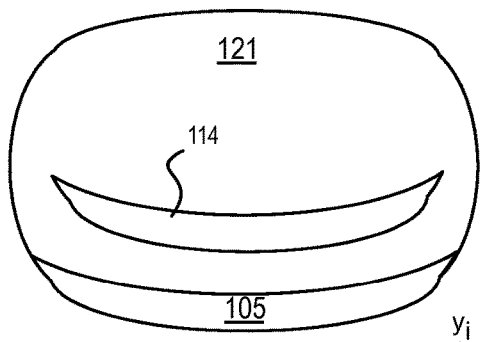
FIGS. 5A, 5B, 5C, and 5D illustrate example images captured by the four image sensors depicted in FIG. 4, in accordance with some embodiments.
Figure 5B:
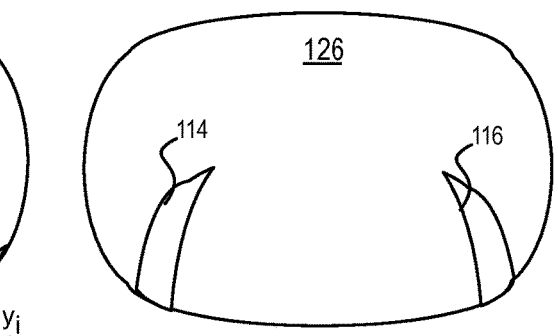
Figure 5C:
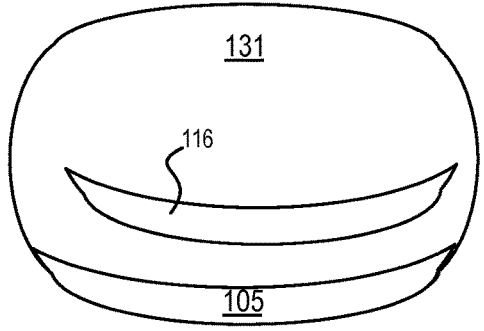
Figure 5D:
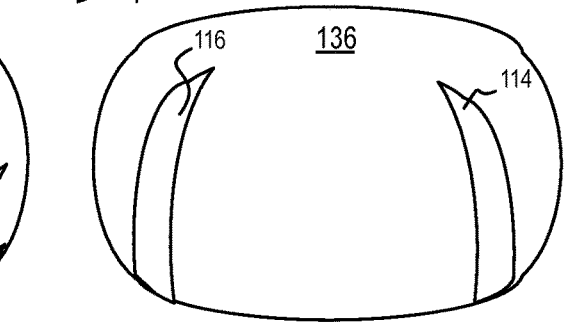

In some embodiments, a ground plane calibration landmark is within the FOV of at least two image sensors. FIG. 4 is an isometric view of host platform 105 further depicting FOV for four image sensors 120, 125, 130, and 135, in accordance with some embodiments. FIGS. 5A, 5B, 5C, and 5D further illustrate example image frames collected by and/or generated from the FOV 121, 126, 131, and 135 associated with each of four image sensors 120, 125, 130, and 135, respectively. Each point within the sensor field of view is associated with an image coordinate. Ground-plane calibration landmark 114 is within three fields of view 121, 126, and 136. Ground-plane calibration landmark 116 is similarly within three fields of view 131, 126, and 136.

Figure 6:
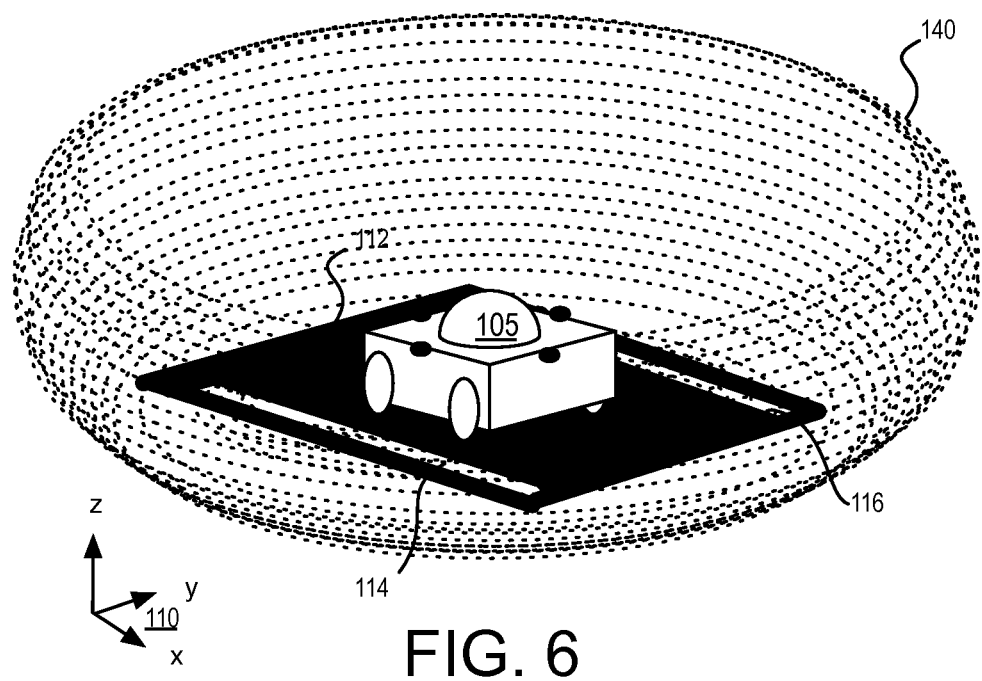
FIG. 6 is an isometric view illustrating a surround image space to be projected on a ground plane, in accordance with some embodiments.

In some embodiments, a machine vision calibration module processing image data from two or more of the image sensors to determine one or more extrinsic sensor parameters. In the context of the exemplary host platform 105 illustrated in FIG. 4, extrinsic parameters at least include information characterizing relative positions and orientations of image sensors 120, 125, 130, and 135. In some embodiments, image data output by a plurality of image sensors is processed into a surround view, or partial surround view, by a machine vision module (e.g., module 115 in FIG. 1B). The surround view is associated with a world coordinate system for a platform. As used herein, a surround view spans a 360° arc about the machine vision platform (e.g., platform 105 FIG. 1B) in a plane parallel to the ground plane. Such a view may be employed first in calibration of image sensor parameters and subsequently as a calibrated view computed based on sensor parameters determined a result of sensor calibration. Calibration parameters determined in accordance with calibration methods and systems described herein may be utilized in generating a calibrated surround view. FIG. 6 is an isometric view illustrating an exemplary surround view 140 that may be generated from image data collected from four image sensors embedded on platform 105. As depicted, a portion of ground plane 110 is within surround view 140. Following embodiments herein, the surround view 140 may be calibrated based groundplane calibration landmarks 114, 116 even where surround view 140 is generated from wide-angle image data. As described further below, the presence of landmarks 114, 116 and an absence of any features similar to the landmarks can serve as the basis for a robust automated sensor calibration method that may be applied in many machine vision environments, particularly for vehicle platforms.

Figure 7:
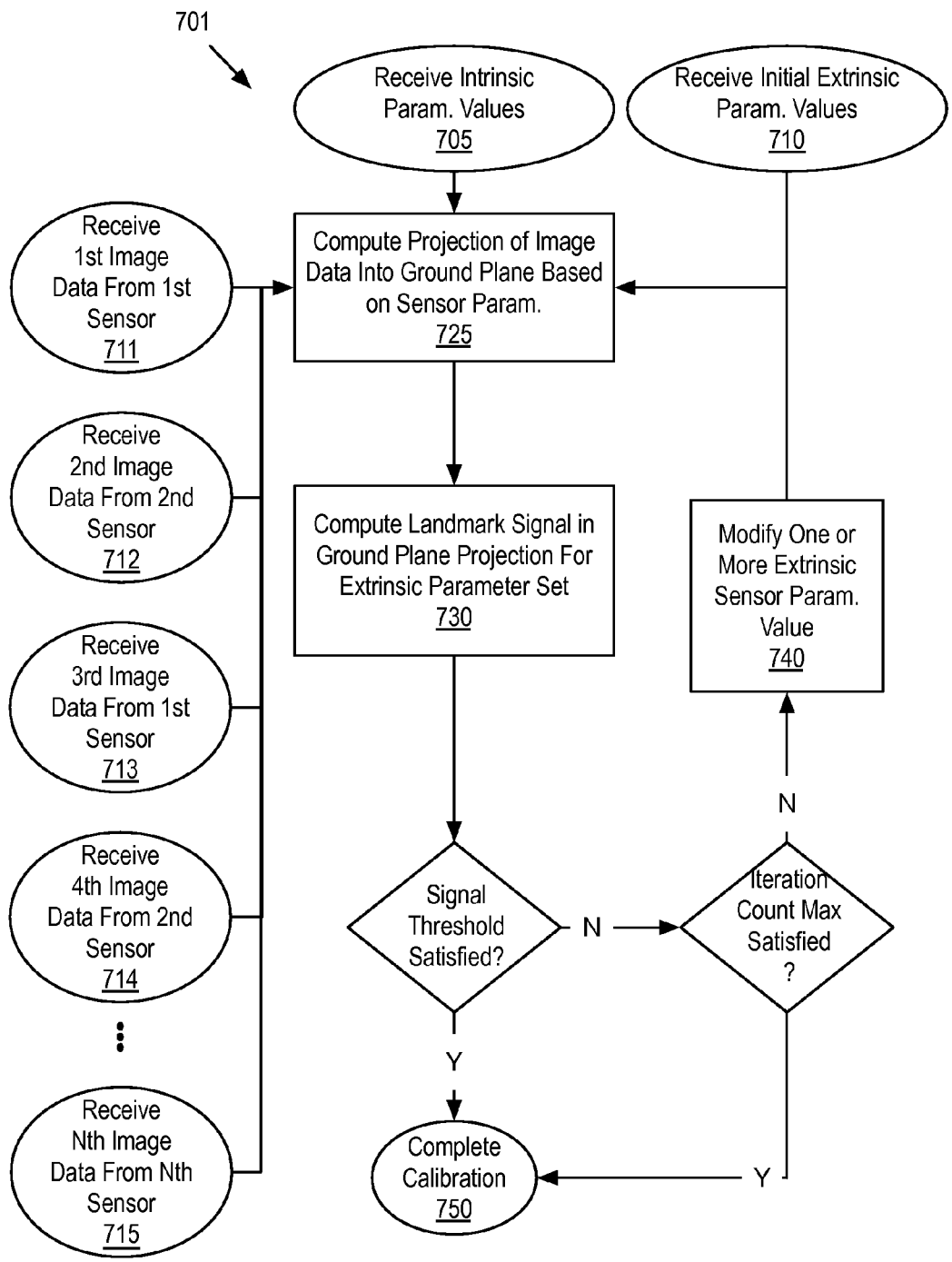
FIG. 7 is a flow diagram illustrating an automated machine vision image sensor calibration method based on ground plane projection, in accordance with some embodiments.

FIG. 7 is a flow diagram illustrating a machine vision image sensor calibration method 701 based on ground plane projection, in accordance with some embodiments. In some embodiments, method 701 is to be automatically performed by a machine vision calibration module, for example embedded within machine vision module 115 (FIG. 1B). Method 701 begins with receiving intrinsic image sensor parameters at operation 705 for each image sensor that is to contribute image data to the calibration. Intrinsic image sensor parameters, such as but not limited to, those characterizing nonlinear distortion of the sensor optical path, may be predetermined following any known technique as embodiments herein are not limited in this respect. In the exemplary embodiment, intrinsic image sensor parameters are received at operation 705 for each of four image sensors (e.g., sensors 120, 125, 130, and 135 illustrated in FIG. 4).

Method 701 is also initialized with a first set of extrinsic parameter values at operation 710 sufficient for a machine vision module to synthesize or construct an initial multi-sensor-based view (e.g., a surround view). Initial extrinsic parameter information may be received at operation 710 for any two or more image sensors coupled to the machine vision module. In some embodiments, the initial extrinsic parameter information includes yaw, pitch, and roll data associated with each image sensor. In some exemplary embodiments, the initial extrinsic parameter information received at operation 710 is sufficient for a machine vision module to generate an initial (un-calibrated) surround view based on first image data received from a first image sensor at operation 711, second image data received from a second image sensor at operation 712, third image data received from a third image sensor at operation 713, and fourth image data received from a fourth image sensor at operation 714. Corresponding initial extrinsic parameter information may be further received at operation 710 for any additional image data received at operation 715 from an $n^{th}$ image sensor. In some embodiments, the extrinsic parameter information includes at least twelve values corresponding to the yaw, pitch, and roll data associated with each of four image sensors.

In embodiments, received image data and the set of parameters currently stored in association with the particular image sensor are employed to compute a projection of the image data into the ground plane. In the illustrative method 701, the surround image space (or a component thereof) is inverse projected into the ground plane at operation 725. An inverse projection projects an image coordinate into the ground plane along a direction within a world coordinate system. In the exemplary embodiment illustrated in FIG. 6, image coordinates corresponding to the surround image space 140 are to be inverse projected onto ground plane 110. A multi-sensor ground plane projected image may be constructed by stitching together projected image data associated with multiple sensors. For an initial iteration of method 701, the ground plane projection is constructed based on the initial extrinsic parameter information received at operation 710 for each image sensor providing input. In the exemplary embodiment, a surround view ground projected image is constructed based on information received from four image sensors including first image data received from a first sensor at operation 711, second image data is received from a second sensor at operation 712, third image data is received from a third sensor at operation 713, and fourth image data is received from a further sensor at operation 714.

Continuing with FIG. 7, at operation 730, the projected image data generated at operation 725 is to be analyzed by a machine vision calibration module to assess a signal indicative of the projected calibration landmarks as a means of determining an adequacy of the extrinsic parameter values employed to compute the ground plane projection. In the exemplary embodiment, a signal indicative of a condition of the calibration landmarks on the projected ground plane view are evaluated or scored at operation 730. The landmark signal may be parameterized by one or more metrics. A control effort may then be applied to the extrinsic parameter set in an automated calibration loop by modifying one or more extrinsic parameter at operation 740 until a calibration routine exit criteria is met and the automated calibration method 701 is deemed complete at operation 750.

In some implementations of operation 730, a single metric is determined for a landmark signal that is a function of a set of multiple extrinsic parameter values. The single metric may be a function of all extrinsic parameter values utilized in computation of the ground plane image projection. For example, one signal metric may be determined for each set of twelve extrinsic parameter values associated with a four-camera surround view. In other embodiments, more than one signal metric, each of which is a function of multiple extrinsic parameter values, is determined at operation 730. For example, a pair of peaks may be identified for each set of twelve extrinsic parameter values associated with a four-camera surround view. A first of the peaks may be associated with a first ground plane projected calibration landmark and a parameterization of the peak, such as peak height, then dependent upon distortion of the landmark. A second of the peaks may be associated with a second ground plane projected calibration landmark. In further embodiments, the pair of signal peak parameters may be compared to each other as a hint to which extrinsic parameter value(s) within a set of parameter values is to be adjusted in a subsequent iteration of method 701.

Automated sensor calibration method 701 may be iterated with one or more extrinsic sensor parameter value varied at operation 740 between iterations to evaluate multiple ground plane projection calibration landmark signals. One or more signal parameter score, such as a maximum peak height, may be stored in association with a given set of extrinsic parameter values evaluated in a particular iteration of method 701. In some embodiments, completion of method 701 is predicated on satisfying a threshold signal parameter score. The signal parameter score threshold may be based on one or more suitable statistic, such as but not limited to: a minimum parameter score; a maximum parameter score, a min/max of an average of a plurality of parameter scores, or a min/max of a sum of a plurality of parameter scores. Any number of more complex logic tests may be devised through conventional techniques.

In response to a given set of parameter values failing to satisfy a score threshold or criteria, operations 725, and 730 are repeated with a new set of extrinsic parameter values. The intrinsic parameter values received at operation 705 may be retained for multiple iterations of method 705, while one or more of the extrinsic parameter values are varied from the prior set (e.g., modified from the initial value set received at operation 710). Iteration of method 701 may be further predicated on a maximum iteration count. In response to a given set of parameters failing to satisfy a score threshold, a best set of extrinsic parameter values may be selected at operation 750 upon reaching the maximum iteration count. For example, parameter values sets stored to memory in association with their corresponding scores may be selected from, and the set of parameter values that maximizes the score then retained in memory at operation 750 as a final result of method 701. In response to a given set of parameter values satisfying a score threshold or criteria, method 701 ends with that set of values stored to memory as the automated calibration result. If desired, the result of method 701 may then be refined, for example through a manual calibration procedure implemented with the assistance of system user.

Figure 8:
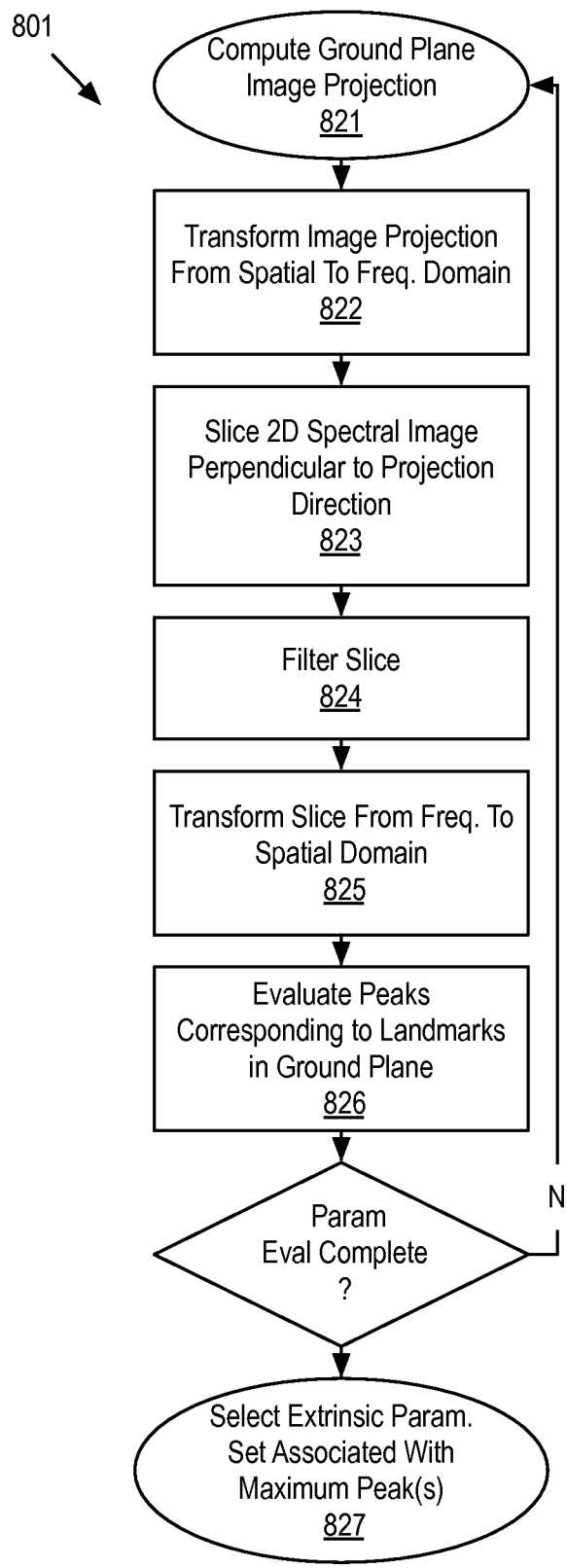
FIG. 8 is a flow diagram illustrating a method for projecting to a ground plane and scoring consistency of landmarks in a ground plane projection, in accordance with some embodiments.

FIG. 8 is a flow diagram illustrating a method 801 for computing a directional image projection and evaluating calibration landmark signals in a ground plane projection, in accordance with some embodiments. Method 801 may be performed within the automated calibration method 701 described above. Specifically, method 801 may be performed to implement operations 725 and 730 introduced in the context of FIG. 7.

Method 801 begins with computing the ground plane image projection at operation 821. In some embodiments, the projection computation is performed on image data from each sensor contributing to a surround view for a direction defined by on one or more extrinsic parameter value for the sensor associated with the image data being projected. In exemplary embodiments with four image sensors, an image from each of the four sensors is projected to the ground plane. For a ground plane projection, the projection direction is perpendicular to the ground plane. Because the calibration marks fall within the FOV of multiple sensors, error in one or more extrinsic parameter will result in projection computations that are inconsistent with each other inducing distortion the projected calibration landmark.

Figure 9A:
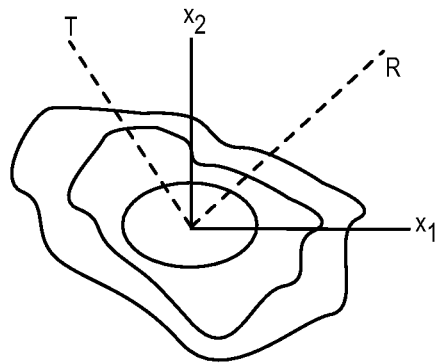
FIGS. 9A, 9B, 9C illustrate a directional parallel projection, which is applied to image frames in accordance to some embodiments.
Figure 9B:
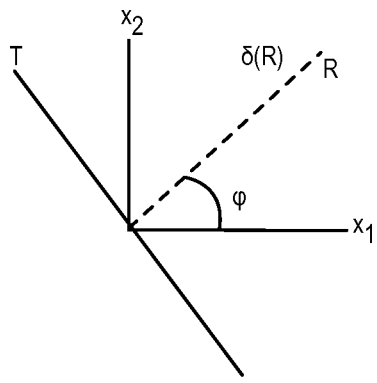
Figure 9C:
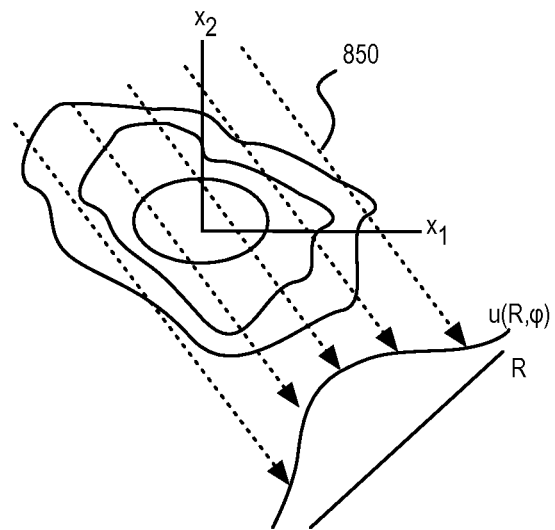

FIGS. 9A, 9B and 9C illustrate a directional projection of the type that is to be applied to a surround image (i.e., to be applied to each image frame comprising a component of the surround view) in accordance with some embodiments. A parallel projection in a particular direction may be considered a convolution of the signals in that dimension with a Dirac delta function line. For example in a coordinate system $(R, T)$ where $u(x_1,x_2)=uv(R,T)$, $\delta(g \cdot x)$ maps to $\delta(R)1(T)$. The convolution of the two-dimensional function $u(x_1,x_2)$ illustrated in FIG. 9A with Dirac line $\delta(g \cdot x)$ illustrated in FIG. 9B results in a projected function $u_p(R,\phi)$ along the direction g illustrated in FIG. 8B-9B. As shown in FIG. 8B-9C, the projection of the two-dimensional function $u(x_1,x_2)$ is along parallel beams 850, all having the specified direction dependent on the angle $\phi$. Angle $\phi$ is parameterized as the direction of parallel projection beams for a two-dimensional image data matrix in the Radon transformation:

$$\mu_p(R,\phi)=\int_{-\infty}^{\infty} u_p(R,\phi)dT = u_\phi(R,T) ** \delta(R) \quad (1)$$

In embodiments, the Radon transform is computed for a 2D frame of image data for an angle $\phi$ corresponding to a set of extrinsic parameter values associated with the sensor that collected the image data. For exemplary embodiments with four image sensors, the Radon transformation may be performed on four image data frames. If the extrinsic parameter values are correct for all image sensors, the projection directions will be properly aligned, and the ground plane projected surround image will properly represent the ground plane calibration landmarks. If the extrinsic parameter values are incorrect for one or more image sensor, the projection directions will be misaligned and the projection computations will generate a ground plane projected surround image that distorts the calibration landmarks. The remaining operations of method 801 are directed toward detecting and/or evaluating distortion in the ground plane projected calibration landmarks.

At operation 822, the ground plane projection is transformed from spatial domain to frequency domain. The 2D projection image may be transformed to the frequency domain with respect to R following any known technique to generate a two-dimensional spectrum of the ground plane projection image. In some embodiments, a Fourier transform of the ground plane projection image is computed. However, approximations may also be employed at operation 822 to simplify the transformation and/or leverage an image computation that may be further employed in other capacities beyond extrinsic parameter calibration. As an alternative to computing the Fourier transformation, for example, a discrete sine transformation (DST) or discrete cosine transformation (DCT) may be computed. Such approximations may have the advantage of leveraging transform modules (hardware and/or software) in an existing image processing pipeline. Frequency domain transform approximations may also generate image data in the frequency domain that is suitable for additional purposes beyond automated sensor calibration, such as, but not limited to image feature classification algorithms.

At operation 823, the two-dimensional spectral image is sliced along a direction perpendicular to the projection direction. In some embodiments, the slice direction is based on the assumption that the platform is aligned parallel to the ground plane landmarks (e.g., parallel to the longest dimension of a pair of parking lines). With the projection aligned parallel to the direction of the landmarks, spectral slice is a one-dimensional spectral signal crossing the origin (corresponding to zero frequencies) and including frequencies associated with the ground plane calibration landmarks. The spectral signal is ideally associated with a projection function perpendicular to the ground plane if sensor extrinsic parameter values are correct. According to the projection-slice theorem (central slice theorem), the projection function $\mu_p(R,\phi)$ and the slice through the two-dimensional spectral image are one-dimensional Fourier transform pairs. The greater the strength of a feature in the spectral signal corresponding to the calibration landmark(s) captured within the slice, the better aligned the image sensors to the ground plane. Hence, the spectral slice provides a basis to assess how well the extrinsic image sensor parameters are aligning to the ground plane within the world coordinate.

In some embodiments, the spectral signal of the slice is filtered at operation 824 to accentuate desired frequency bands. Filtering in the frequency domain may enhance signal to noise ratio in subsequent operations. Any filter suitable for the frequency domain, such as a ramp filter, may be utilized in operation 824.

In some embodiments, an inverse transform is performed on the one-dimensional spectral signal to map the signal back to the spatial domain. In the exemplary method 801, the inverse transformation computed at operation 825 generates a one-dimensional signal of the ground plane projection that can be readily evaluated with respect to the calibration landmarks for the current set of extrinsic parameter values. Transforming the signal back into the spatial domain resolves distinct peaks in the signal associated with distinct calibration landmarks spatially separated within the ground plane. With one signal peak corresponding to one calibration landmark, signal peaks may be parameterized by any technique to generate a score for the camera extrinsic calibration parameters. In general, the signal peak height scales with the strength of a perceived calibration landmark. The inverse transformation computed at operation 825 is dependent on the transformation performed at operation 822. In an embodiment where a Fourier transformation is computed at operation 822 for example, an inverse Fourier transformation is computed at operation 825.

Figure 10A:
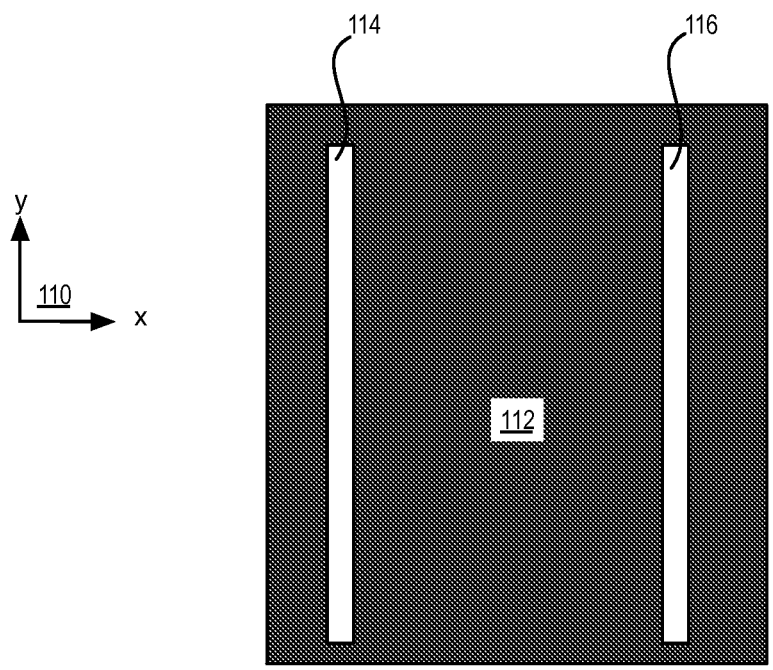
FIG. 10A is a plan view of a ground plane projection associated with calibrated extrinsic parameters, in accordance with some embodiments.
Figure 10B:
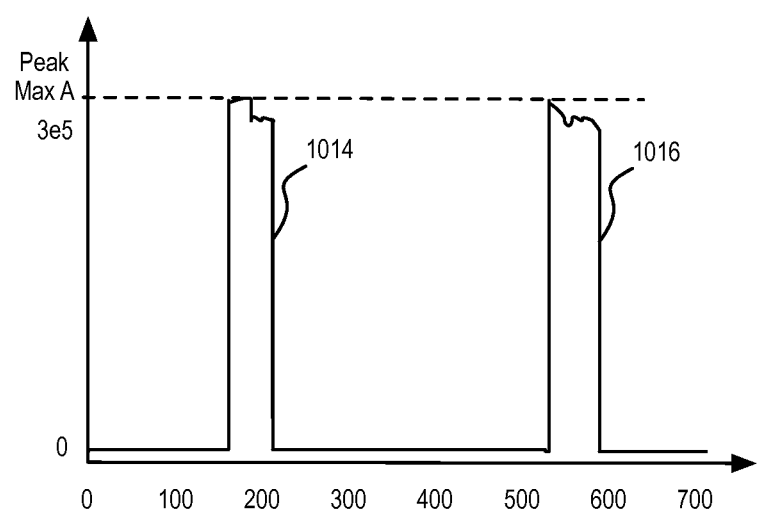
FIG. 10B is a graph of projection results associated with the ground plane projection illustrated in FIG. 10A, in accordance with some embodiments.

FIG. 10A is a plan view of a ground plane projection associated with calibrated extrinsic parameters, in accordance with some embodiments. The ground plane landmarks 114 and 116 (e.g., pair of parking lines) contrast with ground plane background 112. For calibrated extrinsic parameter values (and correct intrinsic parameter values), ground plane landmarks 114 and 116 are straight parallel lines of approximately equal length. FIG. 10B is a graph of a projection signal associated with the calibrated ground plane projection illustrated in FIG. 10A, in accordance with some embodiments. As shown in FIG. 10B, the slice signal has peaks 1014 and 1016 associated with landmarks 114, 116. The peak maximum height is dependent on the spatial dimensions of the landmark within the projected ground plane image such that higher peaks correlate with greater consistency in the ground plane projected image. In some embodiments therefore, a peak minimum threshold at a predetermined value less than or equal to "Max A" may be applied in a calibration control loop as calibration success criteria.

Figure 11A:
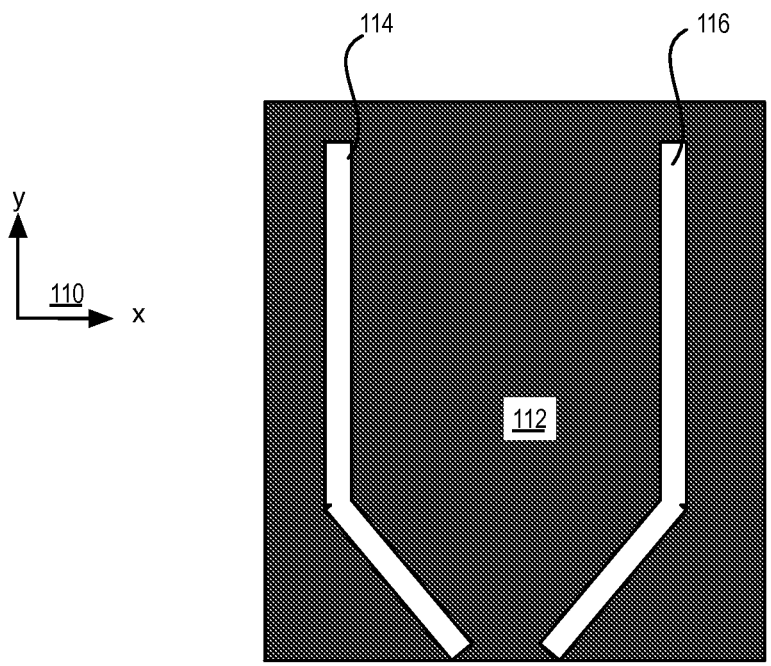
FIG. 11A is a plan view of a ground plane projection associated with un-calibrated extrinsic parameters, in accordance with some embodiments.
Figure 11B:
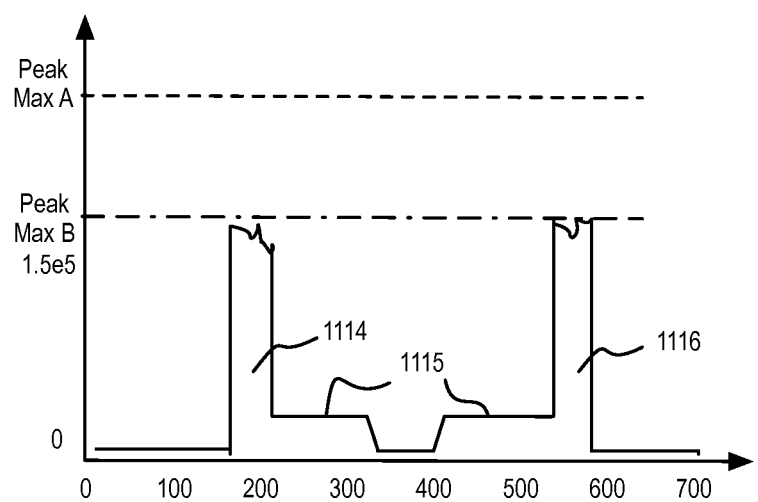
FIG. 11B is a graph of projection results associated with the ground plane projection illustrated in FIG. 11A, in accordance with some embodiments.

FIG. 11A is a plan view of a ground plane projection associated with extrinsic parameters that are not fully calibrated, in accordance with some embodiments. As shown, ground plane landmarks 114 and 116 show distortion resulting from one more incorrect extrinsic sensor parameter value. FIG. 11B is a graph of a projection signal associated with the ground plane projection illustrated in FIG. 11A, in accordance with some embodiments. As shown in FIG. 11B the slice signal has peaks 1114 and 1116 associated with landmarks 114, 116. The peak maximum of "Max B" is well below "Max A" associated with a calibrated sensor parameter set. Any test based on the projection results may be performed to determine if one or more extrinsic parameter values are to be modified and the method 801 repeated in another iteration of an automated calibration control loop. In further embodiments, extrinsic parameter candidates for modification during subsequent iteration of the calibration control loop are identified based on a comparison of one or more peaks in the projection signal, or based on a comparison of the signal level between the peaks relative to outside of the peaks. For example, as further illustrated in FIG. 11B, because peak 1114 and 1116 have approximately the same magnitude and the signal level 1115 between peaks 1114, 1116 is higher than outside of peaks 1114, 1116, calibration module logic may prioritize adjusting an extrinsic parameter associated with an image sensor that has both landmarks 114 and 116 in its FOV (e.g., sensor 125 and/or 135 depicted in FIG. 4) over an alternate image sensor with only one landmark in its FOV (e.g., sensor 120 and/or 130 depicted in FIG. 4).

Figure 12:
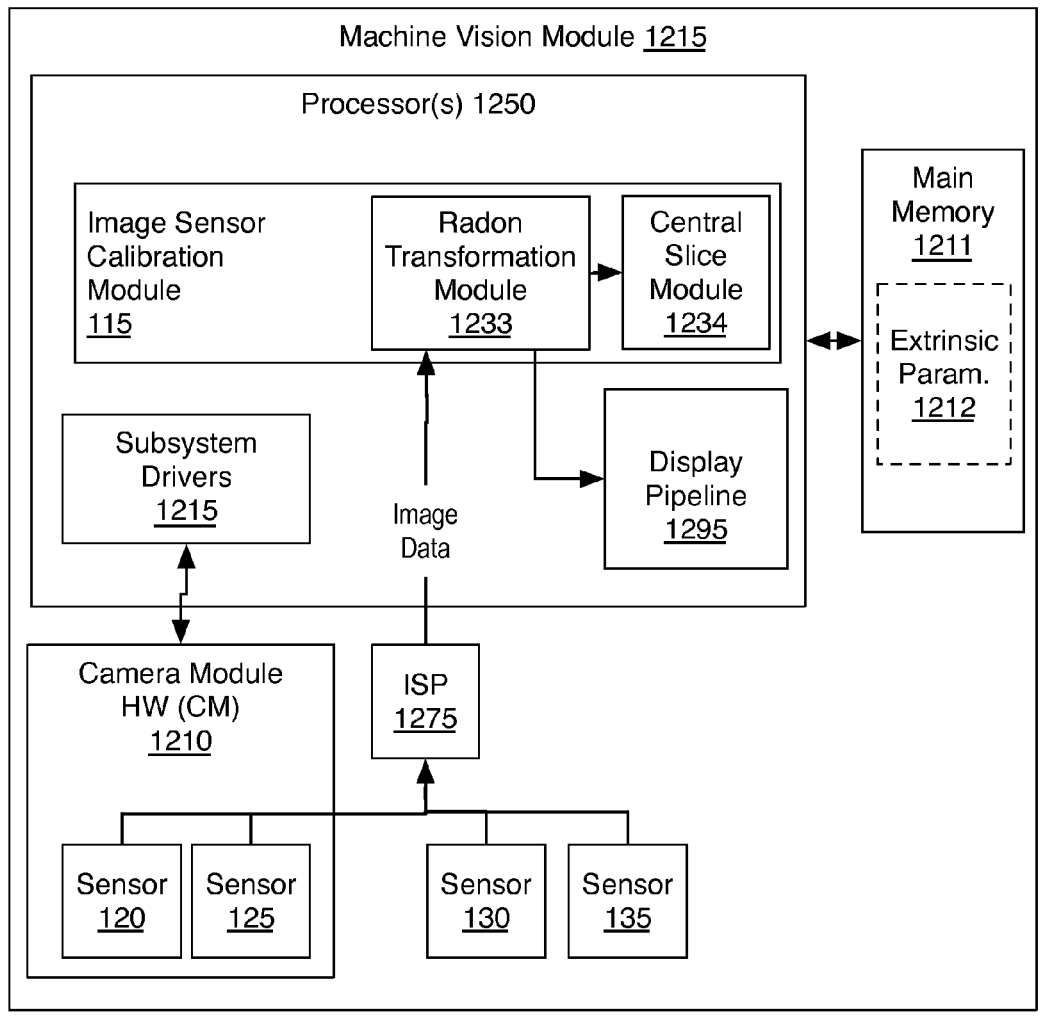
FIG. 12 is a functional block diagram of a machine vision module configured to perform an automated image sensor calibration method based on ground plane projection, in accordance with embodiments.

FIG. 12 is a functional block diagram of machine vision module 1215 configured to perform an automated image sensor calibration method based on ground plane projection, in accordance with embodiments. Machine vision module 1215 includes a camera hardware module 1210 including one or more image sensor coupled to image sensor calibration module 115. FIG. 12 further illustrates how image sensor calibration module 115 may be integrated with various other components to provide a machine vision platform with automated image sensor calibration functionality. Components machine vision module 1215 may be physically separated within a vehicle platform and/or external to the vehicle platform. Machine vision module 1215 may be a component in a vehicle platform. More generally, machine vision module 1215 may be a component in any mobile platform. A mobile platform may refer to any device having a processing system and a mobile power source or supply, such as one or more batteries or other internal power source. Examples of a mobile platform include a laptop computer, tablet, smart device (e.g., smartphone, tablet or smart television), and devices configured to be worn by a person (e.g., wrist computer, finger computer, ring computer, eyeglass computer, etc.). Although some embodiments may be described with a mobile platform implemented by a vehicle by way of example, it may be appreciated that other embodiments may be readily implemented.

Machine vision module 1215 includes at least one camera module (CM). In the exemplary embodiment, CM 1210 further includes camera image sensors 120, 125. Additional image sensors 130, 135 may be included as additional components of CM 1210, or as components of separate camera modules (not depicted). Each sensor 120-135 is associated with a set of extrinsic parameters as described elsewhere herein. Sensors 120-135 may be a HD, FHD, QXGA, WQXGA, QSXGA, or UHD format digital optical imaging devices, for example. In some embodiments, sensors 120-135 have at least 8-megapixel resolution. Camera sensors 120-135 may provide a color resolution of 8 bits, or more per pixel, is operable to capture continuous video frames progressively. Sensors 120-135 may have a pixel frequency of 170 MHz, or more. Camera sensors 120-135 may include an RGB Bayer color filter, an analog amplifier, an A/D converter, other components to convert incident light into a digital signal corresponding to raw image data. Sensors 120-135 may be controlled to operate a rolling shutter or electronic focal plane shutter process where pixels are read out progressively in a line-sequential fashion for a frame. In exemplary video embodiments, sensors 120-135 output multiple consecutively exposed frames. CM 1210 may output raw data associated with the consecutively sampled frames in conformance with any known streaming protocol, such as a MIPI. Raw image data is input to ISP 1275. ISP 1275 is to receive and analyze raw image data during the horizontal and/or vertical blanking periods associated with CM 1210. During raw image data processing, ISP 1275 may perform one or more of color space conversion, noise reduction, pixel linearization, and shading compensation, for example.

Raw data output by CM 1210 and/or pre-processed video data output by ISP 1275 may be further processed by image sensor calibration module 115. In the illustrated embodiment, processor 1250 implements to image sensor calibration module 115. In some embodiments, processor 1250 includes one or more (programmable) logic circuits to perform one or more stages of a method for projecting raw image data output by CM 110 to a ground plane, transforming the projection to the frequency domain, and slicing resulting spectral data along a direction perpendicular to the projection direction. Processor 1250 may further include logic to transform the spectral slice back into spatial domain and to parameterize and/or evaluate the resulting projection signal peaks. For example, in some embodiments, sensor calibration module 115 includes logic to implement one or more of the operations described in the context of method 701 (FIG. 7). In further embodiments, sensor calibration module 115 includes logic to implement one or more of the operations described in the context of method 801 (FIG. 8). In some embodiments, sensor calibration module 115 implements Radon transformation module 1233 and central slice module 1234. Radon transformation module 1233 includes logic to generate one or more ground plane projection, and central slice module 123 includes logic to extract a slice of spectral data along a direction perpendicular to the projection direction. In some embodiments, calibration module 115 is to store calibrated extrinsic parameter values in main memory 1210.

In embodiments, sensor calibration module 115 includes logic to perform the image data transformation operations and image sensor calibration algorithms described elsewhere herein. In some embodiments, sensor calibration module 115 includes logic implemented with programmable circuitry that has been configured through software instruction(s). However, either software or hardware implementations, or a combination thereof, are suitable for implementing one or more stages of an automated method for calibrating extrinsic parameters of image sensors 120-135. For hardware implementations, radon transformation module 1233 and/or central slice module 1234 may be implemented by fixed function logic. For software implementations, any known programmable processor, such as a core of processor 1250 or an execution unit of a graphics processor, may be utilized to implement the logic of radon transformation module 1233 and/or central slice module 1234. In one exemplary embodiment, sensor calibration module 115 is invoked through the user space of a software stack instantiated by processor 1250. In some embodiments, processor 1250 executes an image sensor calibration algorithm instantiated in a kernel space of the software stack. In some embodiments, processor 1250 is programmed with instructions stored on a computer readable media to cause the processor to perform one or more image sensor calibration algorithm method described elsewhere herein.

Subsystem drivers 1215 within a kernel space of an operating system (OS) instantiated by processor 1250 may communicate various camera module parameters, such as camera shutter rates, integration times, etc. in response to commands generated by a machine vision software application layer executing, for example, in the user space. A surround view and/or ground plane projection image as described elsewhere herein can be output to display pipeline 1295 for presentation to a user of machine vision module 1215. In further embodiments and user interface receives inputs from a user, for example during a manual calibration performed by the user based on the output to display pipeline 1295. In some embodiments, sensor calibration module 115 modifies one or more image sensor extrinsic parameter value based on inputs received through the user interface.

Figure 13:
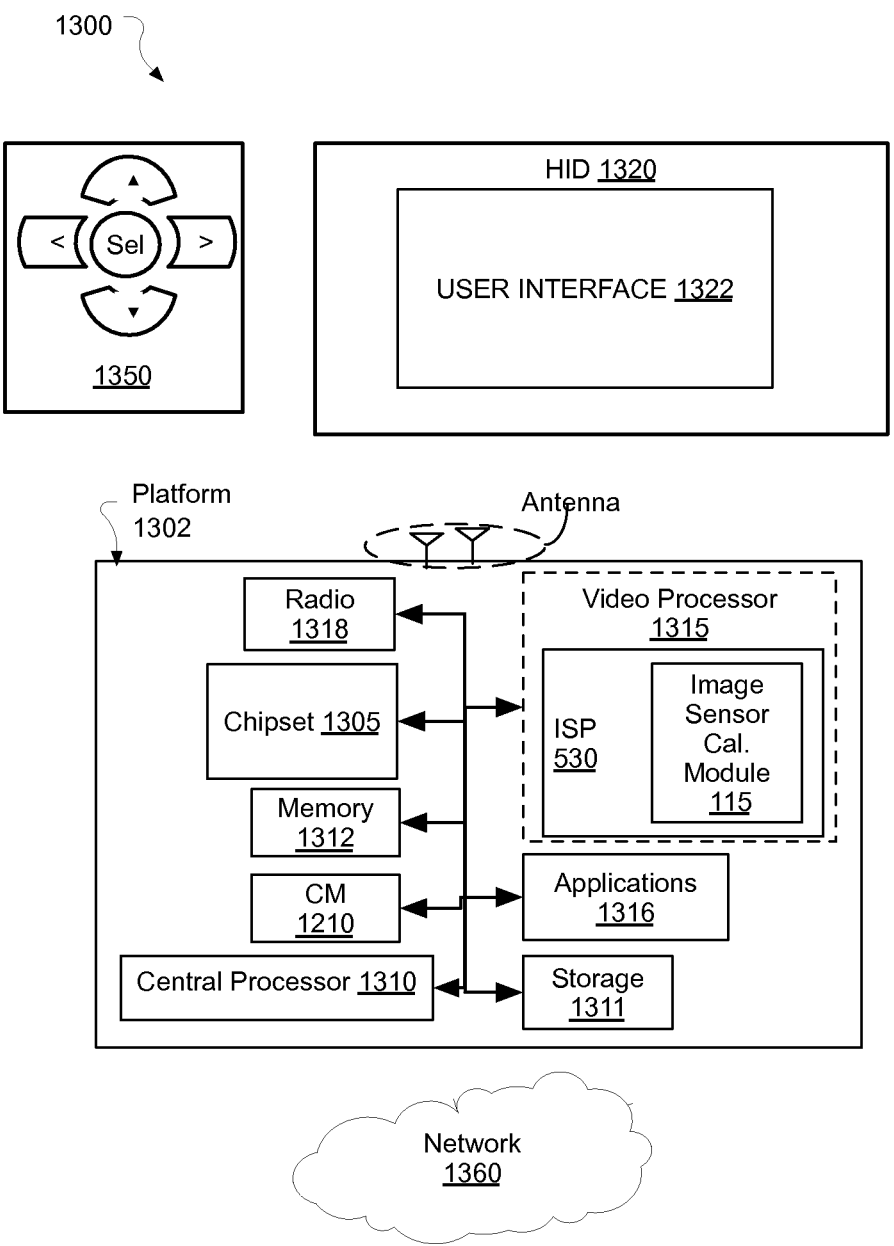
FIG. 13 is a diagram of an exemplary ultra-low power system including an image sensor calibration module, in accordance with some embodiments.

FIG. 13 is a diagram of an exemplary ultra-low power system 1300 including an image sensor calibration module 115, in accordance with some embodiments. System 1300 may be a vehicle cockpit controller, although system 1300 is not limited to this context. For example, if not embedded in a vehicle platform, system 1300 may be incorporated into a wearable computing device, laptop computer, tablet, touch pad, handheld computer, palmtop computer, cellular telephone, smart device (e.g., smart phone, smart tablet or mobile television), mobile internet device (MID), messaging device, data communication device, and other similar mobile devices.

System 1300 includes a device platform 1302 that may implement all or a subset of the image sensor calibration methods described above in the context of FIG. 1A-FIG. 12. In various exemplary embodiments, video processor 1315 executes one or more of Radon and Fourier transformations on image data, for example as described elsewhere herein. Video processor 1315 includes logic circuitry implementing such transformations, for example as described elsewhere herein. In some embodiments, one or more computer readable media may store instructions, which when executed by CPU 1310 and/or video processor 1315, cause the processor(s) to execute one or more of the image sensor calibration methods described elsewhere herein. One or more image sensor extrinsic parameters may then be stored in memory 1312 in association with one or more of a plurality of image sensors associated with CM 1210.

In embodiments, device platform 1302 is coupled to a human interface device (HID) 1320. Platform 1302 may collect raw image data with CM 1210, which may be processed into a ground plane projection and/or scored based on calibration landmarks output to HID 1320. A navigation controller 1350 including one or more navigation features may be used to interact with, for example, device platform 1302 and/or HID 1320. In embodiments, HID 1320 may include any monitor or heads-up display (HUD) coupled to platform 1302 via radio 1318 and/or network 1360. HID 1320 may include, for example, a computer output panel, touch screen display, video monitor, television-like device, and/or a television.

In embodiments, device platform 1302 may include any combination of CM 1210, chipset 1305, processors 1310, 1315, memory/storage 1312, applications 1316, and/or radio 1318. Chipset 1305 may provide intercommunication among processors 1310, 1315, memory 1312, video processor 1315, applications 1316, or radio 1318.

One or more of processors 1310, 1315 may be implemented as one or more Complex Instruction Set Computer (CISC) or Reduced Instruction Set Computer (RISC) processors; x86 instruction set compatible processors, multi-core, or any other microprocessor or central processing unit (CPU).

Memory 1312 may be implemented as a volatile memory device such as, but not limited to, a Random Access Memory (RAM), Dynamic Random Access Memory (DRAM), or Static RAM (SRAM). Memory 1312 may also be implemented as a non-volatile storage device such as, but not limited to flash memory, battery backed-up SDRAM (synchronous DRAM), magnetic memory, phase change memory, and the like.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In embodiments, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

The image data transformation and sensor calibration methods comporting with exemplary embodiments described herein may be implemented in various hardware architectures, cell designs, or "IP cores."

As exemplified above, embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood as physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations that are apparent to persons skilled in the art to which the present disclosure pertains are within the spirit and scope of the present disclosure.

The following paragraphs briefly describe some exemplary embodiments:

In one or more first embodiments, a machine vision calibration system comprises a plurality of image sensors to collect image data associated with multiple fields of view (FOV) encompassing adjacent portions of a ground plane, an image sensor calibration module coupled to the image sensors. The calibration module includes logic to compute a projection of the collected image data into the ground plane based on one or more first extrinsic parameter values associated with the image sensors. The calibration module includes logic to compute, from the ground plane projection, a first landmark signal associated with one or more ground plane calibration landmarks. The calibration module includes logic to select between the one or more first extrinsic parameter values and one or more second extrinsic parameter values based on an evaluation of the first landmark signal.

In furtherance of the first embodiments, the calibration module includes logic to compute the first projection of the image data in a projection direction defined by the one or more first extrinsic parameter values, and compute the first landmark signal by processing the projected image data into a signal associated with a line perpendicular to a projection direction and passing through the one or more ground plane calibration landmarks.

In furtherance of the first embodiments, the calibration module includes logic to modify one or more of the first extrinsic parameter values. The calibration module includes logic to compute a modified projection of the image data into the ground plane based on the one or more modified extrinsic parameter values. The calibration module includes logic to compute, from the modified projection, a second landmark signal associated with the one or more ground plane calibration landmarks. The calibration module includes logic to select between the first and second extrinsic parameter values based on a comparison of the first landmark signal relative to the second landmark signal.

In furtherance of first embodiments, the calibration module includes logic to project first image data, received from a first of the image sensors, in a first direction based on one or more extrinsic parameter values associated with the first image sensor. The calibration module includes logic to project second image data, received from a second of the image sensors, and in a second direction based on one or more extrinsic parameter values associated with the second image sensor. The calibration module includes logic to evaluate the first landmark signal based on a parameterization of one or more peaks in the first landmark signal.

In furtherance of the first embodiments, the one or more ground plane calibration landmarks comprise a pair of parallel lines. The plurality of image sensors comprises at least four image sensors. A first of the image sensors is to collect first image data associated with a first FOV including at least a portion of a first of the parallel lines, but excluding a second of the parallel lines. A second of the image sensors is to collect second image data associated with a second FOV including at least a portion of a second of the parallel lines, but excluding the first of the parallel lines. The calibration module includes logic to evaluate the first landmark signal based on a parameterization of a pair of peaks in the signal associated with the pair of parallel lines.

In furtherance of the first embodiment immediately above, a third of the image sensors is to collect third image data associated with a third FOV including at least a portion of both of the parallel lines. A fourth of the image sensors is to collect fourth image data associated with a fourth FOV including at least a portion of both of the parallel lines. The calibration module includes logic to project third image data, received from the third of the image sensors, in a third direction based on one or more extrinsic parameter values associated with the third image sensor. The calibration module includes logic to project fourth image data, received from the fourth of the image sensors, in a fourth direction based on one or more extrinsic parameter values associated with the fourth image sensor.

In furtherance of the first embodiments, the image sensor calibration module comprises a central slice module including logic to generate two-dimensional spectral data by transforming the projected image data from spatial domain to frequency domain, to slice the two-dimensional spectral data perpendicular to at least one of the projection directions, and to generate the first landmark signal by inverse transforming the spectral data slice back to spatial domain.

In furtherance of the first embodiment immediately above, the image sensor calibration module includes logic to compute the two-dimensional projection image with a Radon transform for an angle corresponding to a set of extrinsic parameter values associated with the sensor that collected the image data.

In furtherance of the first embodiment immediately above, the central slice module includes logic to slice the two-dimensional spectral data into a one-dimensional spectral signal including frequencies associated with the one or more ground plane calibration landmarks.

In furtherance of the first embodiment immediately above, the central slice module includes logic to generate the spectral data by performing a Fourier transform, discrete sine transform, or discrete cosine transform.

In one or more second embodiments, a method of calibrating a machine vision system comprises receiving image data associated with multiple fields of view (FOV) encompassing adjacent portions of a ground plane. The method comprises computing a projection of the collected image data into the ground plane based on one or more first extrinsic parameter values associated with the image sensors. The method comprises computing, from the ground plane projection, a first landmark signal associated with one or more ground plane calibration landmarks. The method comprises selecting between the one or more first extrinsic parameter values and one or more second extrinsic parameter values based on an evaluation of the first landmark signal.

In furtherance of the second embodiments, the method comprises computing the projection comprises computing a first projection of the image data in a projection direction defined by the one or more first extrinsic parameter values, computing the first landmark signal comprises processing the projected image data into a signal associated with a line perpendicular to the projection direction and passing through the one or more ground plane calibration landmarks.

In furtherance of the second embodiments, the method comprises modifying one or more of the first extrinsic parameter values. The method comprises computing a modified projection of the image data into the ground plane based on the one or more modified extrinsic parameter values. The method comprises computing, from the modified projection, a second landmark signal associated with the one or more ground plane calibration landmarks. The method comprises selecting between the first and second extrinsic parameter values based on a comparison of the first landmark signal relative to the second landmark signal.

In further of the second embodiments, computing the projection of the collected image data into the ground plane further comprises projecting first image data, received from a first of the image sensors, in a first direction based on one or more extrinsic parameter values associated with the first image sensor. Computing the projection of the collected image data into the ground plane further comprises projecting second image data, received from a second of the image sensors, in a second direction based on one or more extrinsic parameter values associated with the second image sensor. Selecting between the one or more first extrinsic parameter values and one or more second extrinsic parameter values further comprises evaluating the first landmark signal based on a parameterization of one or more peaks in the first landmark signal.

In furtherance of the second embodiments, the one or more ground plane calibration landmarks comprise a pair of parallel lines. The method further comprises collecting first image data with a first of the image sensors associated with a first FOV including at least a portion of a first of the parallel lines, but excluding a second of the parallel lines. The method further comprises collecting second image data with a second of the image sensors associated with a second FOV including at least a portion of a second of the parallel lines, but excluding the first of the parallel lines. Selecting between the one or more first extrinsic parameter values and one or more second extrinsic parameter values further comprises evaluating the first landmark signal based on a parameterization of a pair of peaks in the first landmark signal associated with the pair of parallel lines.

In furtherance of the second embodiments, computing the first landmark signal further comprises generating two-dimensional spectral data by transforming the projected image data from spatial domain to frequency domain, slicing the spectral data perpendicular to at least one of the projection directions, and inverse transforming the spectral data slice back to spatial domain.

In furtherance of the second embodiment immediately above, computing the projection of the collected image data into the ground plane further comprises computing a Radon transform for an angle corresponding to a set of extrinsic parameter values associated with the sensor that collected the image data. Computing the first landmark signal further comprises slicing the two-dimensional spectral data into a one-dimensional spectral signal including frequencies associated with the one or more ground plane calibration landmarks.

In one or more third embodiments, a machine vision calibration system, comprising means to perform any one of the second embodiments.

In one or more fourth embodiments, a machine vision system comprises the calibration system of the one or more third embodiments and means to collect image data associated with a plurality of overlapping fields of view. The calibration system further includes means to project first image data, received from a first image data collection means, in a first direction based on one or more extrinsic parameter values associated with the first image data collection means. The calibration system further includes means to project second image data, received from a second of the image data collection means, in a second direction based on one or more extrinsic parameter values associated with the second image data collection means. The calibration system further includes means to generate two-dimensional spectral data by transforming the projected first and second image data from spatial domain to frequency domain. The calibration system further includes means to slice the spectral data perpendicular to at least one of the projection directions. The calibration system further includes means to inverse transform the spectral data slice back to a first landmark signal in the spatial domain. The calibration system further includes means to parameterize one or more peaks in the first landmark signal.

In one or more fifth embodiments, a computer readable media includes instructions stored thereon, which when executed by a processing system, cause the system to perform any one of the second embodiments.

In one or more sixth embodiments, a computer readable media includes instructions stored thereon, which when executed by a processing system, cause the system to perform a method comprising receiving image data associated with multiple fields of view (FOV) encompassing adjacent portions of a ground plane, computing a projection of the collected image data into the ground plane based on one or more first extrinsic parameter values associated with the image sensors, computing, from the ground plane projection, a first landmark signal associated with one or more ground plane calibration landmarks, and selecting between the one or more first extrinsic parameter values and one or more second extrinsic parameter values based on an evaluation of the first landmark signal.

In furtherance of the sixth embodiments, the media further includes instructions stored thereon, which when executed by the processing system, further cause the system to perform the method further comprising generating two-dimensional spectral data by transforming the projected image data from spatial domain to frequency domain, slicing the spectral data perpendicular to at least one of the projection directions, inverse transforming the spectral data slice back to spatial domain.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A machine vision calibration system, comprising:
a plurality of image sensors to collect image data associated with multiple fields of view (FOV) encompassing adjacent portions of a ground plane having one or more ground plane calibration landmarks that comprise a pair of parallel lines, wherein:
a first of the image sensors is to collect first image data associated with a first FOV including at least a portion of a first of the parallel lines, but excluding a second of the parallel lines; and
a second of the image sensors is to collect second image data associated with a second FOV including at least a portion of a second of the parallel lines, but excluding the first of the parallel lines; and
an image sensor calibration module coupled to the image sensors and including logic to:
compute a two-dimensional ground plane projection of the collected image data based on a Radon transform of the image data for an angle corresponding to one or more extrinsic parameter values associated with the sensor that collected the image data, wherein to compute the projection, the calibration module includes logic to:
project the first image data in a first direction based on one or more first extrinsic parameter values associated with the first image sensor; and
project the second image data in a second direction based on one or more second extrinsic parameter values associated with the second image sensor;
compute, from the ground plane projection, a first landmark signal associated with the pair of lines;
evaluate the first landmark signal based on a parameterization of a pair of peaks in the signal associated with the pair of parallel lines; and
select one or more first extrinsic parameter values and one or more second extrinsic parameter values based on the evaluation of the first landmark signal.

2. The system of claim 1, wherein the calibration module includes logic to:
compute the first landmark signal by processing the projected image data into a signal associated with a line perpendicular to a projection direction and passing through the pair of lines.

3. The system of claim 1, wherein the calibration module includes logic to:
modify one or more of the first or second extrinsic parameter values from a prior value;
compute a modified projection of the image data into the ground plane based on the one or more modified extrinsic parameter values;
compute, from the modified projection, a second landmark signal associated with the parallel lines; and
select between the prior and modified value of the first or second extrinsic parameter values based on a comparison of the first landmark signal relative to the second landmark signal.

4. The system of claim 1, wherein:
a third of the image sensors is to collect third image data associated with a third FOV including at least a portion of both of the parallel lines;
a fourth of the image sensors is to collect fourth image data associated with a fourth FOV including at least a portion of both of the parallel lines; and
the calibration module includes logic to:
project third image data, received from the third of the image sensors, in a third direction based on one or more extrinsic parameter values associated with the third image sensor; and
project fourth image data, received from the fourth of the image sensors, in a fourth direction based on one or more extrinsic parameter values associated with the fourth image sensor.

5. The system of claim 1, wherein the image sensor calibration module comprises a central slice module including logic to:
generate two-dimensional spectral data by transforming the projected image data from spatial domain to frequency domain;
slice the two-dimensional spectral data perpendicular to at least one of the projection directions; and
generate the first landmark signal by inverse transforming the spectral data slice back to spatial domain.

6. The system of claim 5, wherein the central slice module includes logic to slice the two-dimensional spectral data into a one-dimensional spectral signal including frequencies associated with the one or more ground plane calibration landmarks.

7. The system of claim 5, wherein the central slice module includes logic to generate the spectral data by performing a Fourier transform, discrete sine transform, or discrete cosine transform.

8. A method of calibrating a machine vision system, the method comprising:
receiving image data associated with multiple fields of view (FOV) encompassing adjacent portions of a ground plane having one or more ground plane calibration landmarks that comprise a pair of parallel lines, wherein:
a first of the image sensors is to collect first image data associated with a first FOV including at least a portion of a first of the parallel lines, but excluding a second of the parallel lines; and
a second of the image sensors is to collect second image data associated with a second FOV including at least a portion of a second of the parallel lines, but excluding the first of the parallel lines;

computing a two-dimensional ground plane projection of the collected image data based on a Radon transform of the image data for an angle corresponding to one or more extrinsic parameter values associated with the sensor that collected the image data, wherein computing the projection further comprises:

projecting the first image data in a first direction based on one or more first extrinsic parameter values associated with the first image sensor; and projecting the second image data in a second direction based on one or more second extrinsic parameter values associated with the second image sensor;

computing, from the ground plane projection, a first landmark signal associated with the pair of lines;

evaluating the first landmark signal based on a parameterization of a pair of peaks in the signal associated with the pair of parallel lines; and selecting one or more first extrinsic parameter values and one or more second extrinsic parameter values based on the evaluation of the first landmark signal.

9. The method of claim 8, wherein:
computing the first landmark signal comprises processing the projected image data into a signal associated with a line perpendicular to the projection direction and passing through the pair of lines.

10. The method of claim 8, further comprising:
modifying one or more of the first or second extrinsic parameter values from a prior value;
computing a modified projection of the image data into the ground plane based on the one or more modified extrinsic parameter values;
computing, from the modified projection, a second landmark signal associated with the parallel lines; and
selecting between the prior and modified value of the first or second extrinsic parameter values based on a comparison of the first landmark signal relative to the second landmark signal.

11. The method of claim 8, wherein computing the first landmark signal further comprises:
generating two-dimensional spectral data by transforming the projected image data from spatial domain to frequency domain;
slicing the spectral data perpendicular to at least one of the projection directions; and
generate the first landmark signal by inverse transforming the spectral data slice back to spatial domain.

12. The method of claim 11, wherein:
computing the first landmark signal further comprises slicing the two-dimensional spectral data into a one-dimensional spectral signal including frequencies associated with the pair of lines.

13. A non-transitory computer readable media, including instructions stored thereon, which when executed by a processing system, cause the system to perform a method comprising:

receiving image data associated with multiple fields of view (FOV) encompassing adjacent portions of a ground plane having one or more ground plane calibration landmarks that comprise a pair of parallel lines, wherein:

a first of the image sensors is to collect first image data associated with a first FOV including at least a portion of a first of the parallel lines, but excluding a second of the parallel lines; and a second of the image sensors is to collect second image data associated with a second FOV including at least a portion of a second of the parallel lines, but excluding the first of the parallel lines;

computing a two-dimensional ground plane projection of the collected image data based on a Radon transform of the image data for an angle corresponding to one or more extrinsic parameter values associated with the sensor that collected the image data, wherein computing the projection further comprises:

projecting the first image data in a first direction based on one or more first extrinsic parameter values associated with the first image sensor; and projecting the second image data in a second direction based on one or more second extrinsic parameter values associated with the second image sensor;

computing, from the ground plane projection, a first landmark signal associated with the pair of lines; and selecting one or more first extrinsic parameter values and one or more second extrinsic parameter values based the evaluation of the first landmark signal.

14. The media of claim 13, further including instructions stored thereon, which when executed by the processing system, further cause the system to perform the method further comprising:

generating two-dimensional spectral data by transforming the projected image data from spatial domain to frequency domain;

slicing the spectral data perpendicular to at least one of the projection directions; and generating the first landmark signal by inverse transforming the spectral data slice back to spatial domain.

15. The media of claim 12, wherein the instructions cause the system to perform the method further comprising:

projecting the first image data in the first direction based on a Radon transform of the first image data for a first angle corresponding the one or more first extrinsic parameter values associated with the first image sensor; and projecting the second image data in the second direction based on a Radon transform of the second image data for a second angle corresponding the one or more second extrinsic parameter values associated with the second image sensor.

* * * * *